US011254166B2

(12) United States Patent
Trowbridge et al.

(10) Patent No.: US 11,254,166 B2
(45) Date of Patent: Feb. 22, 2022

(54) METHODS AND APPARATUSES FOR ASSEMBLING TIRE COMPONENTS

(71) Applicant: Compagnie Generale des Etablissements Michelin, Clermont-Ferrand (FR)

(72) Inventors: Jeremy Trowbridge, Greenville, SC (US); Ronald Cress, Clermont-Ferrand (FR); Chaitra Mahesha, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 329 days.

(21) Appl. No.: 16/066,850

(22) PCT Filed: Dec. 20, 2016

(86) PCT No.: PCT/US2016/067707
§ 371 (c)(1),
(2) Date: Jun. 28, 2018

(87) PCT Pub. No.: WO2017/116834
PCT Pub. Date: Jul. 6, 2017

(65) Prior Publication Data
US 2019/0001751 A1 Jan. 3, 2019

Related U.S. Application Data

(63) Continuation of application No. PCT/US2015/067663, filed on Dec. 28, 2015.

(51) Int. Cl.
*B60C 11/00* (2006.01)
*B60C 9/00* (2006.01)
*B60C 11/12* (2006.01)

(52) U.S. Cl.
CPC ........ *B60C 11/0075* (2013.01); *B60C 9/0007* (2013.01); *B60C 11/0008* (2013.01);
(Continued)

(58) Field of Classification Search
CPC ............. B60C 11/0075; B60C 11/0008; B60C 11/0058; B60C 2011/0016; B60C 2011/0025; B60C 2011/0033
See application file for complete search history.

(56) References Cited

U.S. PATENT DOCUMENTS 4,385,653 A * 5/1983 Okazaki ................. B60C 11/18
152/209.5
10,457,101 B2 * 10/2019 Volk ..................... B60C 11/0058
(Continued)

FOREIGN PATENT DOCUMENTS

EP      2944479 A1 * 11/2015  ........... B60C 11/005
JP   2003312211 A  * 11/2003  ........... B60C 11/005
(Continued)

OTHER PUBLICATIONS

European Patent Office; International Search Report and Written Opinion for patent application PCT/US2015/067663; dated Aug. 30, 2016; Publisher: European Patent Office, Rijswijk, Netherlands, pp. 1-9, enclosed.
(Continued)

*Primary Examiner* — Timothy Kennedy
*Assistant Examiner* — Farah Taufiq
(74) *Attorney, Agent, or Firm* — Neal P. Pierotti

(57) ABSTRACT

The invention provides for a heavy truck tire having a sub-casing, a belt package and a rubber tread, the tread comprising a center zone separating two shoulder zones. The upper shoulder layer consisting of an upper shoulder rubber compound being different from a lower shoulder rubber compound, wherein:
(Continued)

the upper shoulder rubber compound has a G*50 of at least 1.3 Mpa and a max tan(δ) of at least 0.12;

the lower shoulder rubber compound has a max tan(δ) not greater than the max tan(δ) of a center rubber compound in the center zone being intended to come into contact with the ground; and the center rubber compound has a max tan(δ) of at most 0.09.

12 Claims, 5 Drawing Sheets

(52) U.S. Cl.
CPC ... *B60C 11/0058* (2013.01); *B60C 2011/0016* (2013.01); *B60C 2011/0025* (2013.01); *B60C 2011/0033* (2013.01); *B60C 2011/1213* (2013.01); *B60C 2200/06* (2013.01)

(56) References Cited

U.S. PATENT DOCUMENTS

| | | | | |
|---|---|---|---|---|
| 2011/0265923 A1* | 11/2011 | Arnold | ............... | C08L 7/00 |
| | | | | 152/151 |
| 2012/0132331 A1* | 5/2012 | Collette | ............... | B60C 11/005 |
| | | | | 152/209.5 |
| 2012/0234442 A1 | 9/2012 | Mayni | | |
| 2014/0332132 A1* | 11/2014 | Gervais | ............... | B60C 11/005 |
| | | | | 152/209.5 |
| 2014/0345773 A1 | 11/2014 | Besson | | |
| 2015/0107735 A1* | 4/2015 | Djelloul-Mazouz | ............... | |
| | | | | B60C 11/0066 |
| | | | | 152/209.5 |
| 2015/0314650 A1* | 11/2015 | Navarro-Losada | ....... | B60C 5/00 |
| | | | | 152/209.5 |
| 2016/0059634 A1* | 3/2016 | Meza | ............... | B60C 11/0058 |
| | | | | 152/209.5 |

FOREIGN PATENT DOCUMENTS

JP          4525010 B2 *   8/2010
WO    WO-2014090621 A *   6/2014   ......... B60C 11/0075

OTHER PUBLICATIONS

European Patent Office; International Search Report and Written Opinion for patent application PCT/US2016/067707; dated Mar. 13, 2017; Publisher: European Patent Office, Rijswijk, Netherlands, pp. 1-9, enclosed.

* cited by examiner

METHODS AND APPARATUSES FOR ASSEMBLING TIRE COMPONENTS

CROSS-REFERENCE TO RELATED APPLICATION

The present application is a national stage entry of International Application Number PCT/US2016/067707 having an international filing date of Dec. 20, 2016 and which claims priority to International Application Number PCT/US2015/067663 which has an international filing date of Dec. 28, 2015. International Application Numbers PCT/US2016/067707 and PCT/US2015/067663 are incorporated by reference herein in their entireties for all purposes.

BACKGROUND OF THE INVENTION

This invention relates generally to a tire. More specifically, this invention relates to tires for heavy commercial vehicles especially tires for trucks and trailers involved in regional or long haul transportation of goods.

It is known in the industry that tire designers must often compromise on certain characteristics of the tires they are designing. Changing a tire design to improve one characteristic of the tire will often result in a compromise; i.e., an offsetting decline in another tire characteristic. One such compromise exists between extending the wear life of the tire tread and reducing the rolling resistance of the tire.

The wear life of the tread can be improved by using tread rubber compound that are more wear resistant or by providing for a thicker tread. These moves, however, typically result in an increase in rolling resistance. In turn, rolling resistance is known to be improved by using rubber compounds which are less hysteretic but such compounds are generally less wear resistant.

Tire designers and those conducting research in the tire industry search for materials and tire structures that can break some of the known compromises. It would be desirable to provide new tire designs that break this compromise between wear life and rolling resistance.

As used herein, the "radial" direction is any direction in any plane that contains the axis of rotation of the tire.

As used herein, the "lateral", "transverse" or "axial" direction is along the tire width and is parallel to the axis of rotation of the tire.

As used herein, the "circumferential" or "longitudinal" direction is at right angle with radial and axial directions.

As used herein, a "tread element" is any type or shape of a structural feature found in the tread that contacts the ground. Examples of tread elements include tread blocks and tread ribs.

As used herein, a "rib" is a tread element that runs substantially in the longitudinal direction of the tire and is not interrupted by any grooves that run in a substantially lateral direction or any other grooves oblique thereto.

As used herein, "phr" is "parts per hundred parts of rubber by weight" and is a common measurement in the art wherein components of a rubber composition are measured relative to the total weight of rubber in the composition, i.e., parts by weight of the component per 100 parts by weight of the total rubber(s) in the composition.

As used herein, elastomer and rubber are synonymous terms.

As used herein, "based upon" is a term recognizing that embodiments of the present invention are made of vulcanized or cured rubber compositions that were, at the time of their assembly, uncured. The cured rubber composition is therefore "based upon" the uncured rubber composition. In other words, the cross-linked rubber composition is based upon or comprises the constituents of the cross-linkable rubber composition.

SUMMARY OF THE INVENTION

The invention provides for a heavy truck tire having a sub-casing, a belt package and a rubber tread, the tread extending axially from a first tread edge to a second tread edge over a rolling tread width, the tread comprising a shoulder zone adjacent to each of said first and second edges and a center zone separating the two shoulder zones, each shoulder zone comprising a radially lower shoulder layer and a radially upper shoulder layer, the upper shoulder layer being intended to come into contact with the ground and the lower shoulder layer being interposed between the belt package and the upper shoulder layer, the upper shoulder layer consisting of an upper shoulder rubber compound, the lower shoulder layer consisting of a lower shoulder rubber compound being different from the upper shoulder rubber compound, wherein:

the upper shoulder layer extends a distance L1 from a tread edge point axially inward, the distance L1 being greater than 15% and less than 40% of the rolling tread width;

the upper shoulder layer has a thickness of between 70% and 130% of the tread depth over at least 80% of the distance L1;

the lower shoulder layer extends a distance L2 from a tread edge axially inward, the distance L2 being greater than 15% of the rolling tread width;

the lower shoulder layer has a thickness of at least 4 mm over the portion of the shoulder zone which covers the belt package;

the upper shoulder rubber compound has a G*50 of at least 1.3 Mpa and a max tan($\delta$) of at least 0.12;

the lower shoulder rubber compound has a max tan($\delta$) not greater than the max tan($\delta$) of a center rubber compound in the center zone being intended to come into contact with the ground; and the center rubber compound has a max tan($\delta$) of at most 0.09.

In another embodiment, the center zone comprises an upper center layer being intended to come into contact with the ground and a lower center layer being interposed between the belt package and the upper center layer, the lower center layer consisting of a lower center rubber compound having a max tan($\delta$) not greater than the max tan($\delta$) of the upper center rubber compound.

In another embodiment, the upper center rubber compound has a max tan($\delta$) of at most 0.08.

In another embodiment, the upper shoulder rubber compound has a G*50 of at least 1.6 Mpa.

In another embodiment, the lower shoulder layer has a thickness of at least 4.5 mm over the portion of the distance L1 which covers the belt package.

In another embodiment, the lower center rubber compound is different from the upper center rubber compound and has a max tan($\delta$) not greater than 0.07.

In another embodiment, the lower center layer is designed to not come into contact with the ground during the recommended wear life of the tire and the lower center rubber compound has a max tan($\delta$) not greater than 0.05.

In another embodiment, the lower center layer is designed to not come into contact with the ground during the recommended wear life of the tire and the lower center rubber compound uses a blend of carbon black having a CTAB specific surface area of between 35 and 65 m2/g in a loading not greater than 55 phr.

In another embodiment, a visible interface between the upper shoulder rubber compound and the center rubber compound intended to come into contact with the ground is placed in a tread groove.

In another embodiment, a boundary between the lower rubber compounds and the upper rubber compounds is substantially parallel to a ground contact surface of the tread.

In another embodiment, the boundary between the lower rubber compounds and the upper rubber compounds is located between 2 mm and 5 mm radially outside the bottom of the tread grooves.

In another embodiment, the center zone comprising an upper center layer being intended to come into contact with the ground and a lower center layer being interposed between the belt package and the upper center layer, wherein the same rubber compound is used in the lower shoulder layer and in the lower center layer.

In another embodiment, the same rubber compound is used in the lower shoulder layer, in the lower center layer and in the upper center layer.

The foregoing and other objects, features and advantages of the invention will be apparent from the following more detailed descriptions of a particular embodiment of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of the same or similar reference numerals in the figures denotes the same or similar features.

DETAILED DESCRIPTION OF PARTICULAR EMBODIMENTS

Figure 1:
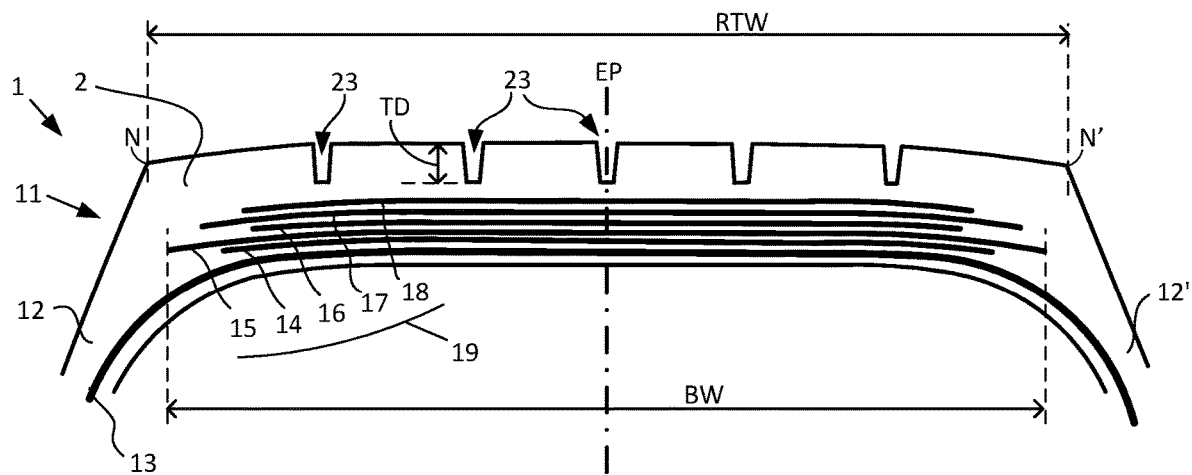
FIG. 1 is a partial section view of a heavy truck tire according to the prior art.

As shown in section by FIG. 1, a heavy truck radial tire 1 generally comprises a crown portion 11 connected by respective sidewalls 12, 12' to beads portions (not represented). More specifically, one or more body plies 13 run radially from a bead core in a bead portion to an opposite bead core in an opposite bead portion. Beads, body ply(s) and sidewalls are generally referred to as the tire sub-casing.

In the crown portion 11 of the tire, belts 14, 15, 16, 17 and 18 are located radially outward around the sub-casing, thus around the body ply(s) 13. Belts may comprise a breaker ply 14, working plies 15 and 17 (so called because they provide reinforcements at angle to one another and at angle to the body ply reinforcements. Belt 16 may be a helicoid winding of circumferential reinforcements (often called "zero degree reinforcements" because they run at an angle close to zero degree relative to the circumferential direction of the tire). Belt 18 may be a protector ply.

As used herein, the term "ply" or "plies" refers to a reinforcement layer of the tire and is not limited to a particular method of manufacturing the tire or of manufacturing the ply itself. The assembly of those circumferential belts is generally referred to as a belt package 19. This reinforced structure may comprise a lower or greater number of plies or a different arrangement of them depending upon the exact tire type and upon its manufacturing process but this principle is widely known and used in heavy truck tires. A belt width BW is defined as the greatest axial distance between remote belt edges of any belt in the belt package 19.

The assembly of the sub-casing and the belt package is generally referred as the casing.

The tread 2 is attached around the above described reinforced structure. The tread is the rubber part of the tire that is coming into contact with the ground when the tire is rolling. A rolling tread width RTW is defined as the distance from a first edge N to an opposite second edge N'. The tread edges are defined as the maximum axial locations where the tread of the tire no longer comes in contact with the ground under standard, straight rolling conditions (75% of the TRA load at standard pressure for the tire). These locations do not account for tread that may intermittently come in contact (such as is the case for a sacrificial rib).

The tread may comprise any number of grooves 23 in any shape or form to provide grip over different kind of surfaces and to drain water out of the contact patch when rolling on a wet surface. In a new tread, the depth of those grooves is generally referred to as the tread depth TD.

Tire 1 is substantially symmetrical about the equatorial plane EP. Therefore, equatorial plane EP bisects tire 1 into opposing halves of substantially the same construction.

Reference will now be made in detail to embodiments of the invention, examples of which are illustrated in the drawings. These examples are provided by way of explanation of the invention.

FIGS. 2 to 9 showing different embodiments of the invention are partial views limited to the left part of the full-width view of FIG. 1. Relative to equatorial plane EP, the other half of the tire may be substantially symmetric. It may also be notably different as long as it remains within the scope of the invention as limited by the claims.

Figure 2:
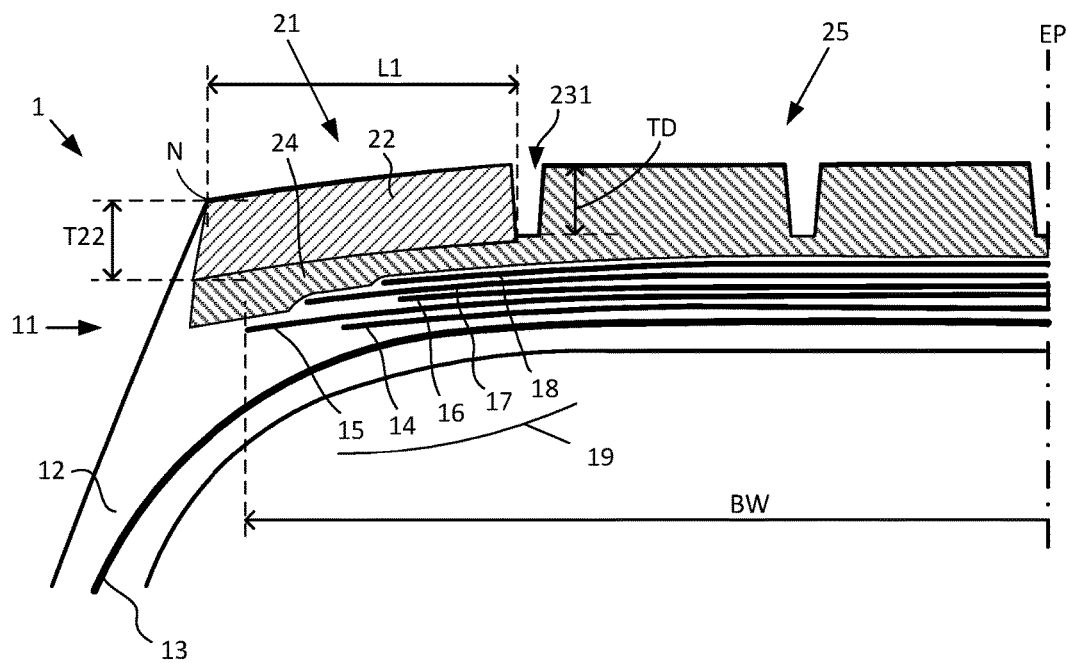
FIG. 2 is a partial section view of an embodiment of a heavy truck tire according to the invention.

As shown in FIG. 2, according to an embodiment, tire 1 has a tread with a center zone and a shoulder zone defined by the use of different rubber compounds.

The shoulder zone 21 comprises two different layers: a radially lower shoulder layer 24 and a radially upper shoulder layer 22. The upper shoulder layer 22 is intended to come into contact with the ground when the tire is rolling and the lower shoulder layer 24 is interposed between the upper shoulder layer and the belt package 19. The upper shoulder layer 22 extends axially from edge N inward to the first groove 231 over a distance L1, having a thickness T22. In this embodiment, the thickness T22 is about 110% of tread depth TD over the full distance L1.

The upper shoulder layer 22 consists of an upper shoulder rubber compound which is different from the lower shoulder rubber compound used in the lower shoulder layer 24. The upper shoulder compound has higher wear resistance characteristics and the lower shoulder rubber compound has better rolling resistance characteristics.

In this embodiment, the center zone 25 of the tread uses over its full thickness the same rubber compound used in the lower shoulder layer 24.

The length L1 is representing 18% of RTW in this embodiment. The thickness of the lower shoulder layer 24 is greater than 4 mm over the portion of the shoulder zone which covers the belt package 19.

Figure 3:
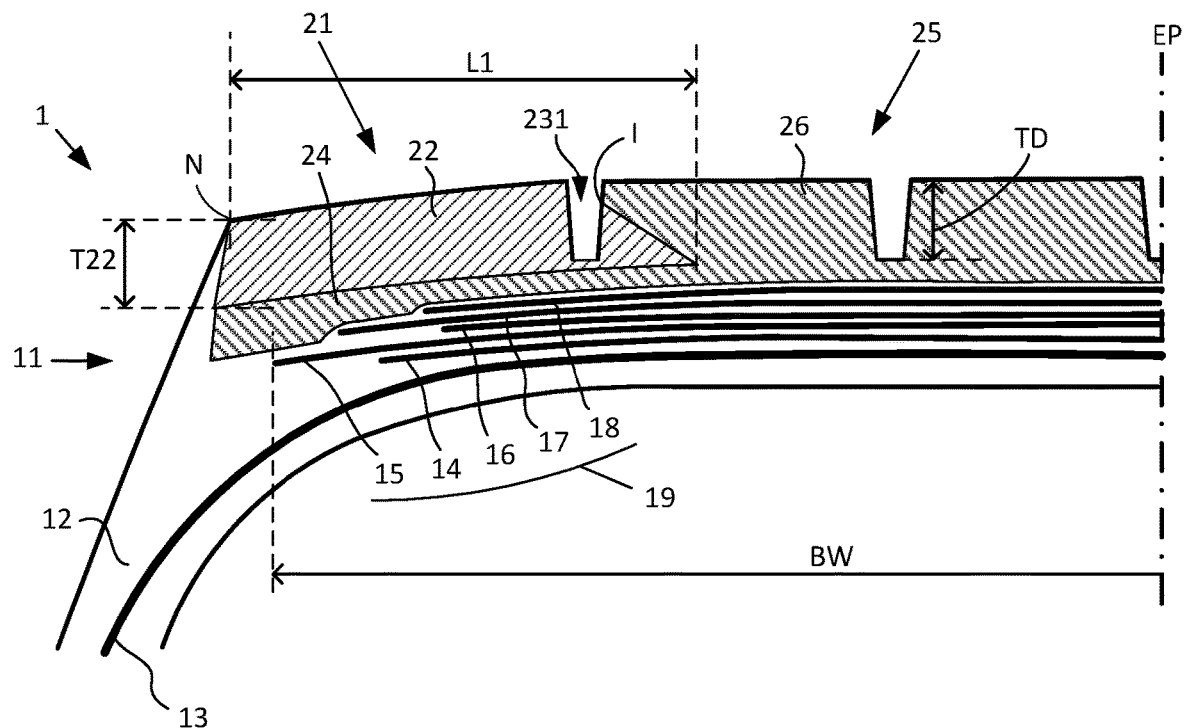
FIG. 3 is a partial section view of a heavy truck tire according to another embodiment.

FIG. 3 shows another embodiment where the upper shoulder layer 22 extends beyond the first groove 231 and tapers into the second rib. The distance L1 is about 25% of RTW, being much longer than on FIG. 1. However the visible interface I between the two different compounds is still located in the first groove 231.

Figure 4:
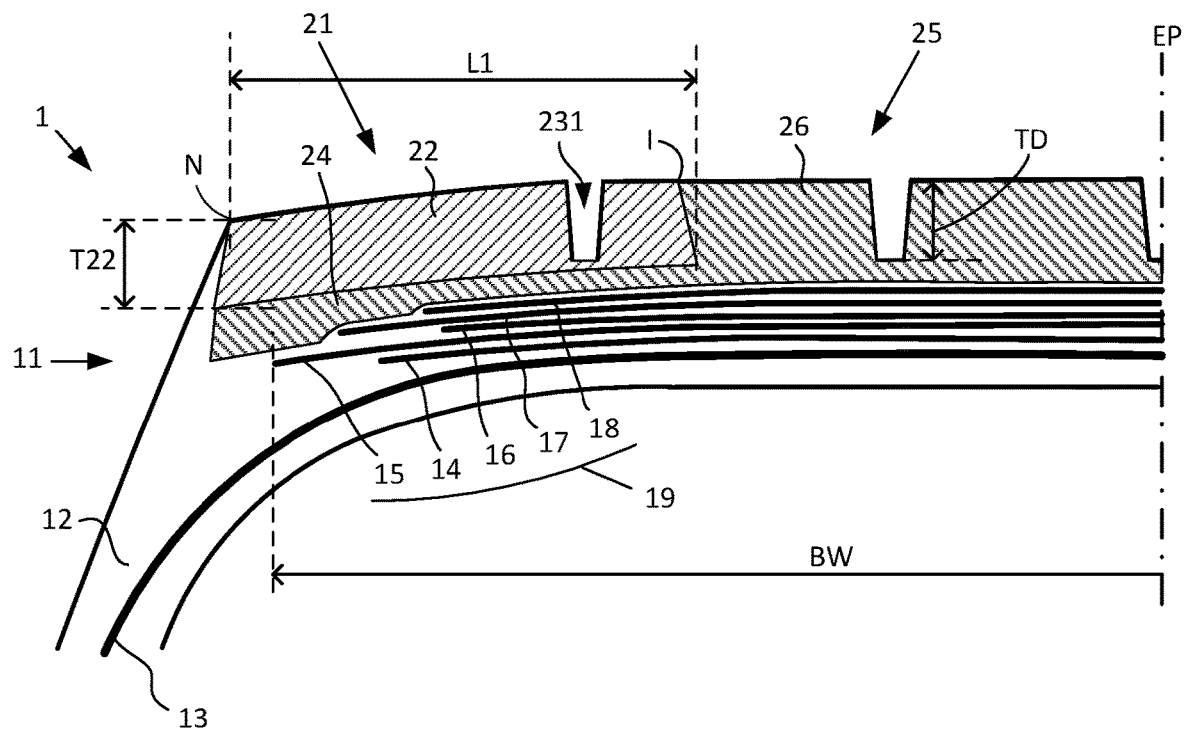
FIG. 4 is a partial section view of a heavy truck tire according to another embodiment.

FIG. 4 shows another embodiment where the visible interface I is located on the contact surface of the second rib, the distance L1 being of similar value to that of FIG. 3.

Figure 5:
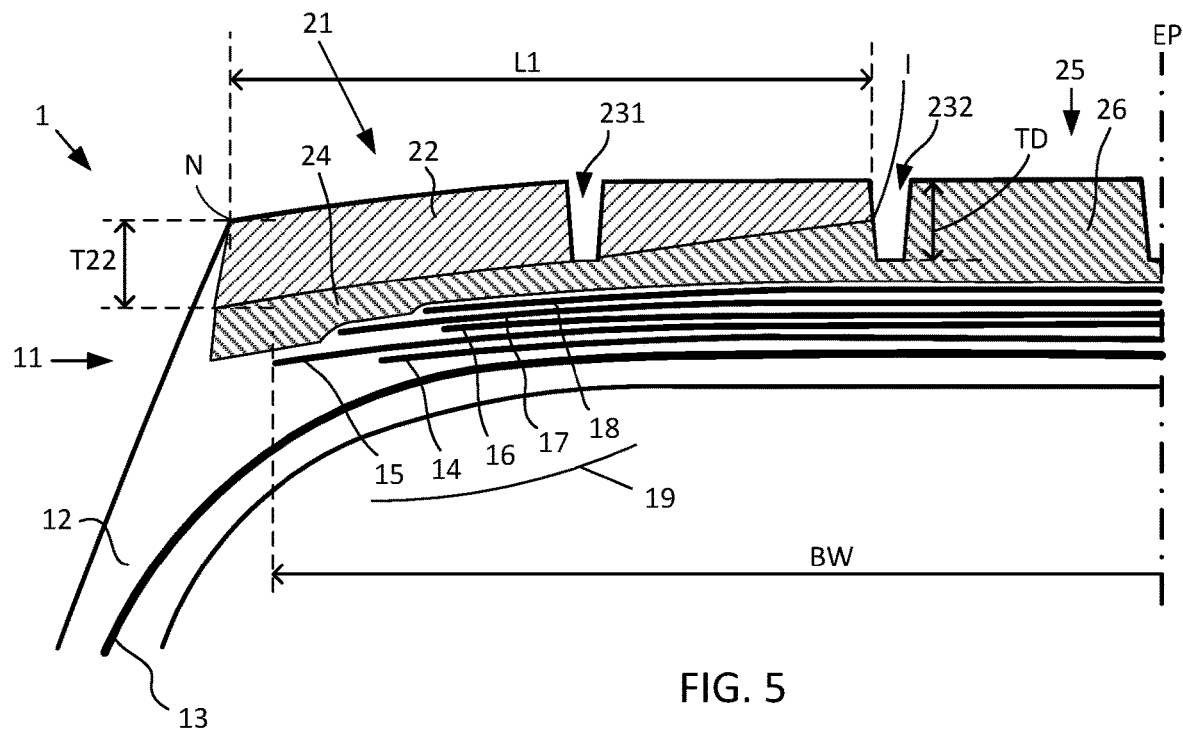
FIG. 5 is a partial section view of a heavy truck tire according to another embodiment.

FIG. 5 shows another embodiment where the upper shoulder layer 22 extends until the second groove 232, tapering up to allow for a gradually thicker lower layer in the second rib. Distance L1 is about 35% of RTW, being then much longer than on FIGS. 3 and 4.

Figure 6:
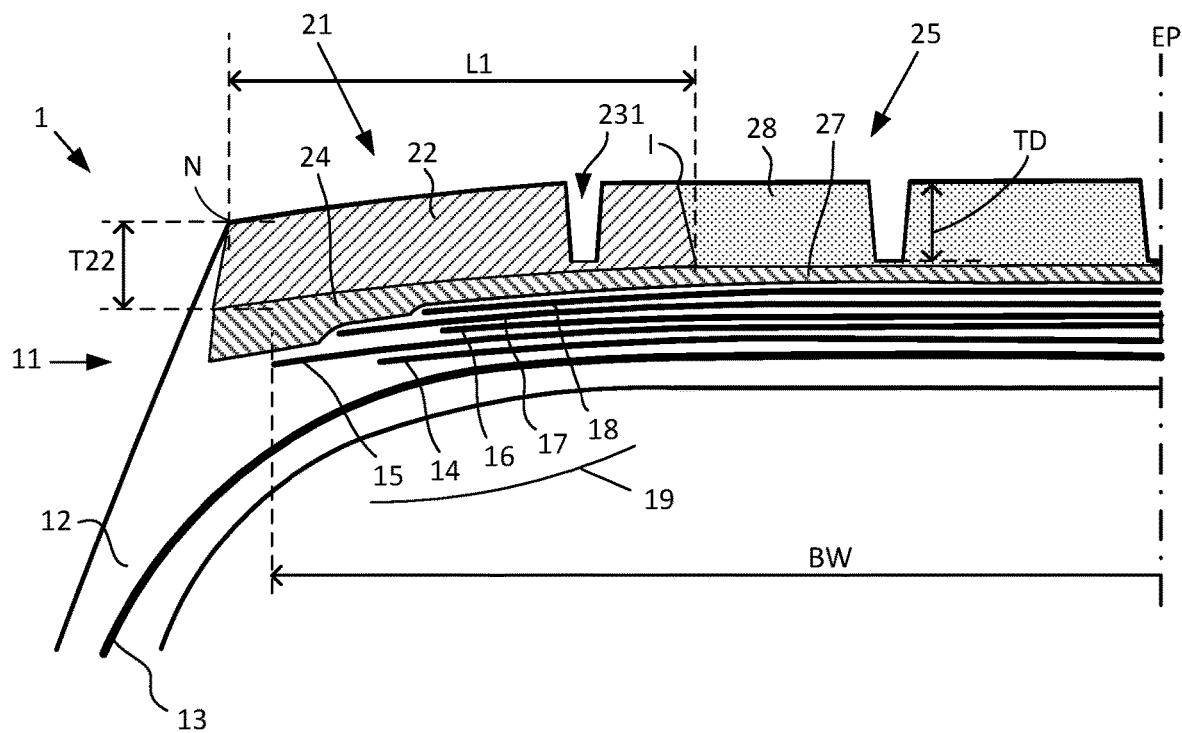
FIG. 6 is a partial section view of a heavy truck tire according to another embodiment.

FIG. 6 shows another embodiment where the tread center zone 25 also comprises two layers using different rubber compounds. The upper center layer 28 uses an upper center layer compound which is different from the lower center compound used in the lower center layer 27 and also different from the compound used in the upper shoulder layer 22. In this embodiment the same compound is used in the lower layers of the center and shoulder zones but it is understood that there could also be different compounds across the tread.

Figure 7:
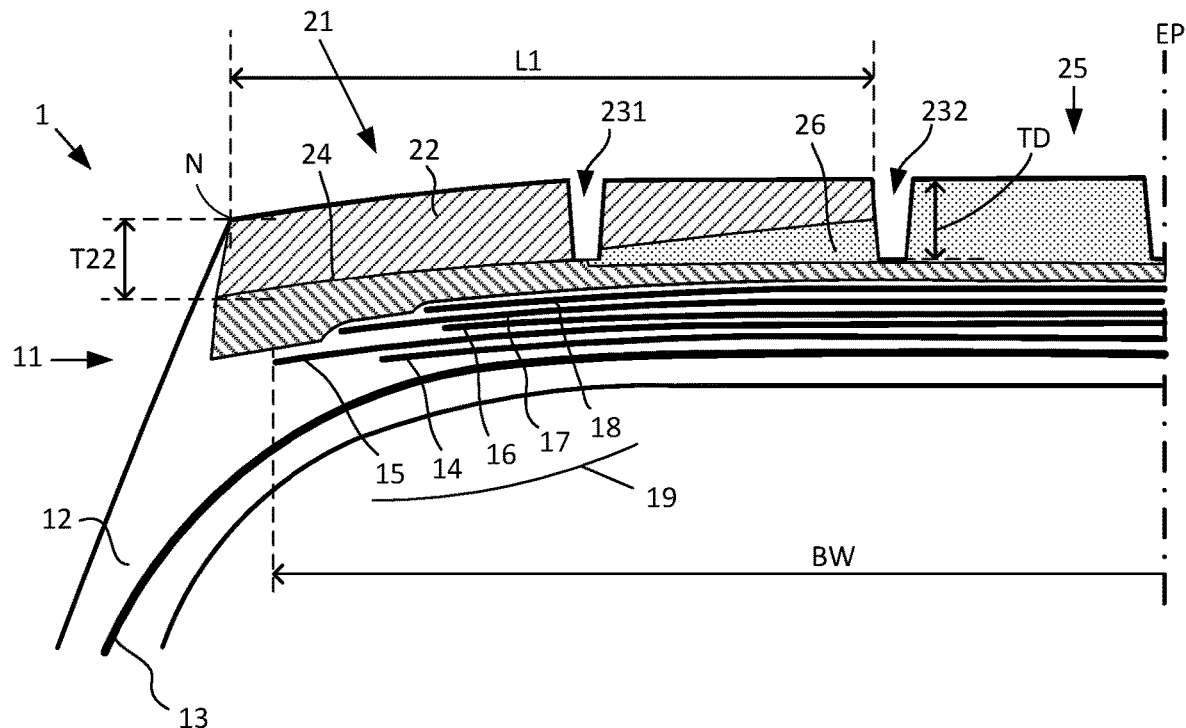
FIG. 7 is a partial section view of a heavy truck tire according to another embodiment.

FIG. 7 shows another embodiment similar to FIG. 6 in that the center zone 25 comprises two layers using different rubber compounds, this time including the configuration of upper layers shown on FIG. 5.

FIGS. 6 and 7 illustrate the same principle on the basis of the configuration shown in FIGS. 4 and 5 but it should be obvious that it could be applied with any other configuration.

Figure 8:
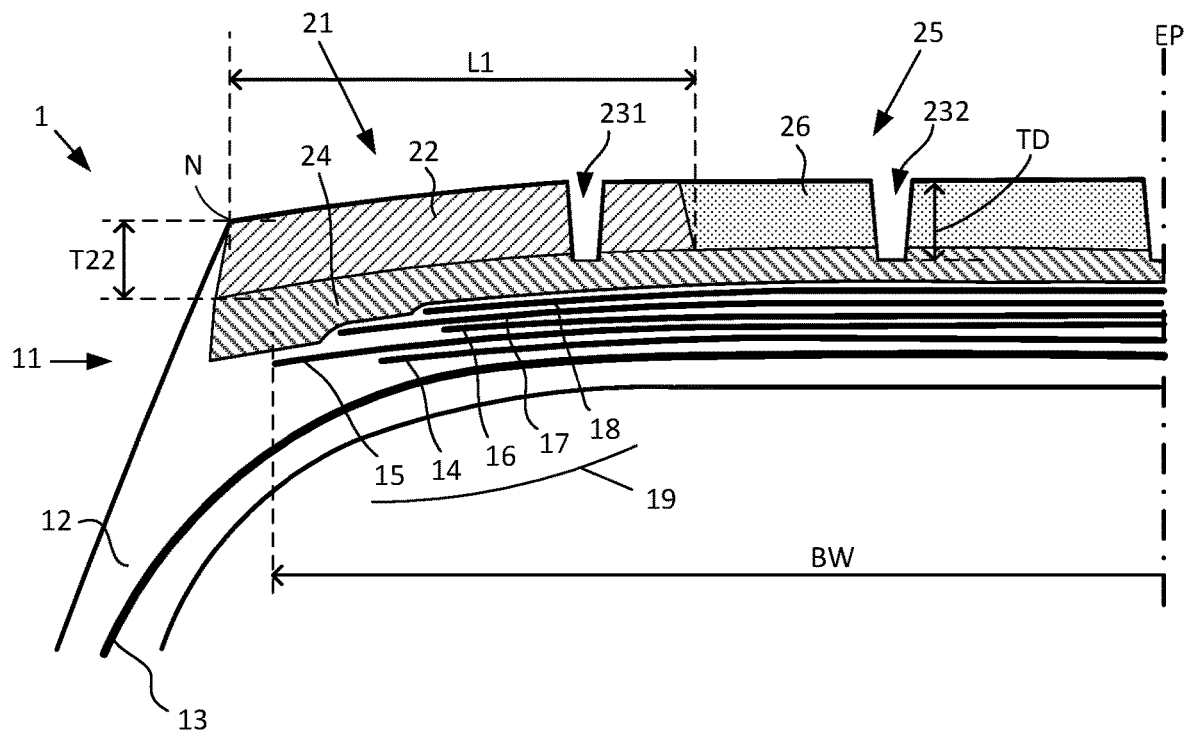
FIG. 8 is a partial section view of a heavy truck tire according to another embodiment.

FIG. 8 shows another embodiment similar to FIG. 6 in that the center zone 25 comprises two layers using different rubber compounds but where the lower layer in the center and shoulder zones are made thicker to reach higher than the bottoms of the tread grooves. The boundary is located between 2 mm and 5 mm radially outside the bottom of the tread grooves.

Figure 9:
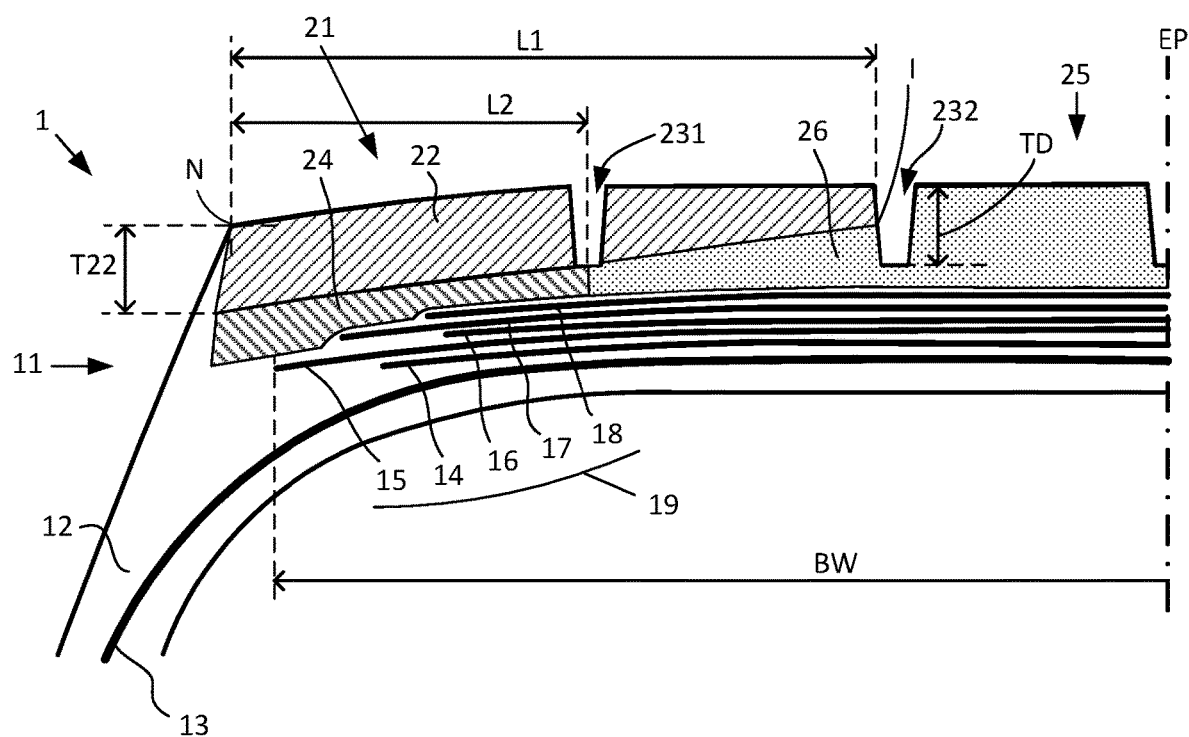
FIG. 9 is a partial section view of a heavy truck tire according to another embodiment.

FIG. 9 shows another embodiment similar to FIG. 5 in that the center zone 25 uses the same rubber compound over its full thickness but where the lower shoulder layer uses another rubber compound extending from edge N inward (toward the equatorial plane EP) over a distance L2.

Again, the FIGS. only illustrate a limited number of examples of configurations of the different zones and compounds. Many other configurations are possible, for instance by modifying the illustrated elements or combining together elements shown in isolation on the different FIGS. Also as explained earlier, a tire according to the invention may or may not be symmetric, that is to say that a tire according to the invention may or may not have the same configuration on both tire halves either side of its equatorial plane EP.

According to the invention however, the distance L1 is comprised between 15% and 40% of the rolling tread width RTW and the upper shoulder layer 22 has a thickness of between 70% and 130% of the tread depth TD over at least 80% of the distance L1.

According to the invention, the lower shoulder layer extends a distance L2 from the edge (N) axially inward, the distance L2 being greater than 15% of the rolling tread width RTW and the lower shoulder layer has a thickness of at least 4 mm over the portion of the shoulder zone which covers the belt package.

According to the invention, the upper shoulder rubber compound has a complex dynamic shear modulus at 50% strain (G*50) of at least 1.3 Mpa and has a max tan(δ) of at least 0.12.

According to the invention, the rubber compound intended to contact the ground in the center zone has a max tan(δ) of not more than 0.09.

According to the invention, the lower shoulder rubber compound has a max tan(δ) not greater than the max tan(δ) of the rubber compound intended to contact the ground in the center zone.

Tires according to the invention demonstrate a break in the compromise of performances described in the preamble of this specification regarding wear resistance and rolling resistance.

The rubber compounds used for the center zone and for the lower shoulder layer may be based upon natural rubber or upon synthetic polyisoprene with a majority of cis-1,4 chains and possibly on at least one other diene elastomer and of a reinforcing filler consisting:

(i) either of a white filler of the silica and/or alumina type having SiOH and/or AlOH surface functions, selected from the group formed by precipitated or pyrogenic silicas, aluminas or aluminosilicates, with a specific surface area in the range between 120 and 200 m2/g, used in a loading between 0 phr and 70 phr, (ii) or of a blend of carbon black having a CTAB specific surface area of between 20 and 120 m2/g in a loading greater than or equal to 0 phr and less than or equal to 25 phr and of a white filler described in (i), in which the overall content of filler is between 40 phr and 70 phr.

The CTAB specific surface area is determined according to AFNOR Standard NFT 45-007 (November 1987, method B).

If a clear filler or white filler is used, a coupling and/or coating agent, chosen from agents known to those skilled in the art, must be used. Examples of preferred coupling agents that may be mentioned are sulphurized alkoxysilanes of the bis-(3-trialkoxysilylpropyl) polysulphide type, and of these, notably, the bis(3-triethoxysilylpropyl) tetrasulphide marketed by Degussa under the trade names Si69 for the pure liquid product and X50S for the solid product (blended 50/50 by weight with N330 black). Examples of coating agents that may be mentioned are fatty alcohol, alkylalkoxysilane such as hexadecyltrimethoxy or triethoxy silane marketed by Degussa under the trade names Si 116 and Si216 respectively, diphenylguanidine, polyethylene glycol, and silicone oil, modified by means of the OH or alkoxy functions if required. The coating and/or coupling agent is used in a proportion of between 1/100 and 20/100 by weight to the filler, and preferably in the range from 2/100 to 15/100 if the clear filler forms the whole of the reinforcing filler and in the range from 1/100 to 20/100 if the reinforcing filler is formed by a blend of carbon black and clear filler.

Other examples of reinforcing fillers, having the morphology and SiOH and/or AlOH surface functions of the materials of the silica and/or alumina type described above and suitable for use according to the invention in total or partial replacement of these, that may be mentioned include carbon blacks modified either during synthesis by the addition of a silicon and/or aluminium compound to the oil supplied to the furnace, or after synthesis by the addition of an acid to an aqueous suspension of carbon black in a sodium silicate and/or aluminate solution so as to coat at least part of the surface of the carbon black with SiOH and/or AlOH functions. Some non-limiting examples of this type of carbonated filler with SiOH and/or AlOH surface functions that may be mentioned are the CSDP fillers described at Conference No. 24 of the ACS Meeting, Rubber Division, Anaheim, Calif., 6-9 May 1997, and those mentioned in patent application EP-A-0 799 854.

If a clear filler is used as the sole reinforcing filler, the properties of hysteresis and cohesion are obtained by using a precipitated or pyrogenic silica or a precipitated alumina or an aluminosilicate with a CTAB specific surface area in the range from 120 to 180 m2/g. Some non-limiting examples of this type of filler that may be mentioned are the silicas: KS404, marketed by Akzo, Ultrasil VN2 or VN3 and BV3370GR marketed by Degussa, Zeopol 8745 marketed by Huber, Zeosil 175MP or Zeosil 11 65M marketed by Rhodia, HI-SIL 2000 marketed by PPG, etc.

Among the diene elastomers that may be used in a blend with natural rubber or a synthetic polyisoprene with a majority of cis-1,4 chains, mention may be made of polybutadiene (BR), preferably with a majority of cis-1,4 chains, stirene-butadiene copolymer (SBR) solution or emulsion, butadiene-isoprene copolymer (BIR), or even stirene-butadiene-isoprene terpolymer (SBIR). These elastomers may be elastomers modified during polymerization or after polymerization by means of branching agents such as divinylbenzene or star forming agents such as carbonates, tin halogens and silicon halogens, or alternatively by means of functionalizing agents causing oxygenated carbonyl, carboxyl functions or an amine function to be grafted on to the chain or at the end of the chain, by the action of dimethyl- or diethylamino-benzophenone for example. In the case of blends of natural rubber or synthetic polyisoprene with a majority of cis-1,4 chains with one or more diene elastomers, mentioned above, the natural rubber or synthetic polyisoprene is preferably used in a majority proportion and more preferably in a proportion of more than 70 phr.

For example, in the configurations where the tread consists of two elastomeric compounds as in FIGS. 2 to 5, those compounds may be as described in the table below.

|  | Upper Shoulder Compound | -Center compound lower-shoulder compound |
|---|---|---|
| NR (phr) | 80 | 100 |
| BR (phr) | 20 |  |
| N234 (phr) | 49 | 5.7 |
| Silica (160 m2/g) (phr) |  | 38 |
| N330/coupling agent (phr) |  | 3.8/3.8 |
| Anti-Degradants (such as Paraffin, anti-oxidant) (phr) | 4 | 2.5 |
| Cure Package (such as Stearic acid, ZnO, Sulphur, Accelerator) (phr) | 6.58 | 8.64 |
| Covering agent (phr) |  | 0.33 |
| G* 50% cc/60° C. (Mpa) | 1.6 | 1.4 |
| Max tan(δ) | 0.13 | 0.06 |

The loss factor "tan(δ)" is a dynamic property of the rubber compound. It is measured on a viscosity analyzer (Metravib VA4000) according to Standard ASTM D5992-96. The response of a test specimen consisting of two cylindrical pellets each 2 mm thick and one centimeter in diameter is recorded (the test specimen is made from samples taken from a tire mid-way up the height of the layer concerned as close as possible to the region of the equatorial plane in a region that is thick enough to be able to form the test specimen), the specimen being subjected to simple alternating sinusoidal shear loadings at a frequency of 10 Hz, at a temperature of 60° C. The sweep covers amplitude of deformation from 0.1% to 50% peak to peak (on the outbound cycle) then from 50% to 1% peak to peak (on the return cycle). The results that are used here are the loss factor tan(δ) and the complex dynamic shear modulus. The complex dynamic shear modulus is denoted "G*50" in reference to the 50% strain applied during the test. During the outbound cycle, the maximum value of tan δ that is observed is denoted "max tan(δ)".

It should be understood from the foregoing description that various modifications and changes may be made to the embodiments of the present invention without departing from its true spirit. For example, due to the lack of electrical conduction of some rubber compounds, it is well known that tire treads may include provisions to conduct static electricity between the ground and the tire rim. Those provisions can include specific compounds or layer profiles being inserted in the tread for this specific purpose. It is understood that such limited variations are not in contradiction to the spirit of the invention and should not influence the way the invention is perceived from the above description or the appended claims.

The invention claimed is:

1. A heavy truck tire comprising:
a sub-casing, a belt package and a rubber tread, the tread extending axially from a first tread edge to a second tread edge over a rolling tread width, the tread comprising a shoulder zone adjacent to each of said first and second edges and a center zone separating the two shoulder zones, each shoulder zone comprising a radially lower shoulder layer and a radially upper shoulder layer, the upper shoulder layer being intended to come into contact with the ground and the lower shoulder layer being interposed between the belt package and the upper shoulder layer, the upper shoulder layer comprising an upper shoulder rubber compound, the lower shoulder layer comprising a lower shoulder rubber compound being different from the upper shoulder rubber compound, wherein the upper shoulder rubber compound has better wear resistance characteristics than the lower shoulder rubber compound, wherein:
the upper shoulder layer extends a distance L1 from a tread edge axially inward, the distance L1 being greater than 15% and less than 40% of the rolling tread width;
the upper shoulder layer has a thickness of between 70% and 130% of the tread depth over at least 80% of the distance L1;
the lower shoulder layer extends a distance L2 from a tread edge axially inward, the distance L2 being greater than 15% of the rolling tread width;
the lower shoulder layer has a thickness of at least 4 mm over the portion of the shoulder zone which covers the belt package;
the upper shoulder rubber compound has a G*50 of at least 1.3 Mpa and a max tan(δ) of at least 0.12;
the lower shoulder rubber compound has a max tan(δ) not greater than the max tan(δ) of an upper center rubber compound in the center zone being intended to come into contact with the ground; and
wherein the center zone comprising an upper center layer being intended to come into contact with the ground, wherein the upper center layer having the upper center rubber compound that is a different rubber compound than the upper shoulder rubber compound, and wherein the upper center rubber compound has a max tan($\delta$) of at most 0.08;
wherein a groove of the tread is defined by both the upper shoulder rubber compound and the upper center rubber compound such that an interface is present between the upper shoulder rubber compound and the upper center rubber compound and is visible upon looking into the groove, wherein the groove is a shoulder groove of the tread which is located closest to the first tread edge inward axially, and wherein the interface is located in an axially inward side of the shoulder groove such that the axially inward side of the shoulder groove is formed by both the upper shoulder rubber compound and the upper center rubber compound, and wherein a bottom of the shoulder groove and an axially outboard outer side of the shoulder groove are both formed completely by the upper shoulder rubber compound.

2. The heavy truck tire as in claim 1, wherein the center zone comprising a lower center layer being interposed between the belt package and the upper center layer, wherein the lower center layer having a lower center rubber compound having a max tan($\delta$) not greater than the max tan($\delta$) of the upper center rubber compound.

3. The heavy truck tire as in claim 1, wherein the upper shoulder rubber compound has a G*50 of at least 1.6 Mpa.

4. The heavy truck tire as in claim 1, wherein the lower shoulder layer has a thickness of at least 4.5 mm over the portion of the distance L1 which covers the belt package.

5. The heavy truck tire as in claim 2, wherein the lower center rubber compound is different from the upper center rubber compound and has a max tan($\delta$) not greater than 0.07.

6. The heavy truck tire as in claim 5, wherein the lower center layer is designed to not come into contact with the ground during the recommended wear life of the tire and the lower center rubber compound has a max tan($\delta$) not greater than 0.05.

7. The heavy truck tire as in claim 6, wherein the lower center layer is designed to not come into contact with the ground during the recommended wear life of the tire and the lower center rubber compound uses a blend of carbon black having a CTAB specific surface area of between 35 and 65 m2/g in a loading not greater than 55 phr.

8. The heavy truck tire as in claim 5, wherein a boundary between the lower rubber compounds and the upper rubber compounds is substantially parallel to a ground contact surface of the tread.

9. The heavy truck tire as in claim 5, wherein a boundary between the lower rubber compounds and the upper rubber compounds is located between 2 mm and 5 mm radially outside the bottom of the tread grooves.

10. The heavy truck tire as in claim 1, wherein the same rubber compound is used in the lower shoulder layer and in the lower center layer.

11. The heavy truck tire as in claim 10, wherein the same rubber compound is used in the lower shoulder layer, in the lower center layer and in the upper center layer.

12. A heavy truck tire comprising:
a sub-casing, a belt package and a rubber tread, the tread extending axially from a first tread edge to a second tread edge over a rolling tread width, the tread comprising a shoulder zone adjacent said first edge, and a center zone, said shoulder zone comprising a radially lower shoulder layer and a radially upper shoulder layer, the upper shoulder layer being intended to come into contact with the ground at a ground engaging surface, the upper shoulder layer comprising an upper shoulder rubber compound, the lower shoulder layer comprising a lower shoulder rubber compound being different from the upper shoulder rubber compound, wherein the upper shoulder rubber compound has better wear resistance characteristics than the lower shoulder rubber compound, wherein:
the upper shoulder layer extends a distance L1 from a tread edge axially inward;
the upper shoulder layer has a thickness of between 70% and 130% of the tread depth over at least 80% of the distance L1;
the lower shoulder layer extends a distance L2 from a tread edge axially inward;
the upper shoulder rubber compound has a G*50 of at least 1.3 Mpa and a max tan($\delta$) of at least 0.12;
the lower shoulder rubber compound has a max tan($\delta$) not greater than the max tan($\delta$) of an upper center rubber compound in the center zone being intended to come into contact with the ground; and
wherein the center zone comprising an upper center layer being intended to come into contact with the ground at the ground engaging surface, wherein the upper center layer having the upper center rubber compound that is a different rubber compound than the upper shoulder rubber compound, and wherein the upper center rubber compound has a max tan($\delta$) of at most 0.08;
wherein the tread defines a first groove in the shoulder zone and a second groove, wherein the first groove is closer than the second groove to the first tread edge axially, wherein an interface between the upper shoulder layer and the center zone extends in both an axial direction and a radial direction and is inward from the first groove in the axial direction and engages the ground engaging surface at a location spaced from and free from engagement with both the first groove and the second groove and between both the first groove and the second groove in the axial direction.

* * * * *